US012682167B2

(12) United States Patent      (10) Patent No.:      US 12,682,167 B2

Edwards et al.      (45) Date of Patent:      Jul. 14, 2026

(54) SYSTEMS AND METHODS FOR ALTERNATIVE CONTENT RECOMMENDATIONS BASED ON ANALYZING POTENTIAL INTERPRETATIONS USING SUPPLEMENTAL INPUTS

(71) Applicant: Capital One Services, LLC, McLean, VA (US)

(72) Inventors: Joshua Edwards, Philadelphia, PA (US); David Weekly, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 182 days.

(21) Appl. No.: 18/772,075

(22) Filed: Jul. 12, 2024

(65) Prior Publication Data

US 2026/0017454 A1      Jan. 15, 2026

(51) Int. Cl.
G06F 40/274      (2020.01)
G06F 3/01      (2006.01)
G06V 40/16      (2022.01)

(52) U.S. Cl.
CPC ............ G06F 40/274 (2020.01); G06F 3/013 (2013.01); G06V 40/174 (2022.01)

(58) Field of Classification Search
None
See application file for complete search history.

(56) References Cited

U.S. PATENT DOCUMENTS

| | | | |
|---|---|---|---|
| 2019/0034038 A1* | 1/2019 | Rudchenko | G06F 40/274 |
| 2019/0278840 A1* | 9/2019 | Sasano | G06F 16/313 |
| 2020/0364413 A1* | 11/2020 | Yoon | G10L 15/005 |
| 2022/0035999 A1* | 2/2022 | Pawelec | G06F 3/0236 |
| 2022/0057931 A1* | 2/2022 | Zhu | G06F 3/04883 |
| 2022/0075941 A1* | 3/2022 | Huang | G06F 40/274 |
| 2022/0318500 A1* | 10/2022 | Prasad | G06N 3/0464 |
| 2023/0229246 A1* | 7/2023 | Gerhard | G06F 3/0238 |
| | | | 715/700 |
| 2026/0017454 A1* | 1/2026 | Edwards | G06F 40/274 |
| 2026/0017455 A1* | 1/2026 | Edwards | G06F 40/274 |
| 2026/0044674 A1* | 2/2026 | Edwards | G06F 40/20 |

* cited by examiner

*Primary Examiner* — Peter Vincent Agustin

(74) *Attorney, Agent, or Firm* — Foley & Lardner LLP

(57)      ABSTRACT

Systems and methods for generating dynamic conversational recommendations. Conversational recommendations include communications between a user and a system that may maintain and/or facilitate (e.g., via autocomplete functionality) a conversational tone, cadence, and/or speech pattern of a human during an interactive exchange between the user and the system. The system may use artificial intelligence applications to generate suggested dynamic conversational recommendations based on initial user inputs (e.g., such as autocomplete functionality).

20 Claims, 8 Drawing Sheets

100

400

Receive a first input of a first type

402

Generate a first output based on the first input

404

Receive a second input of a second type

406

Generate a second output based on the second input

408

Generate a conversational recommendation based on the second output

410

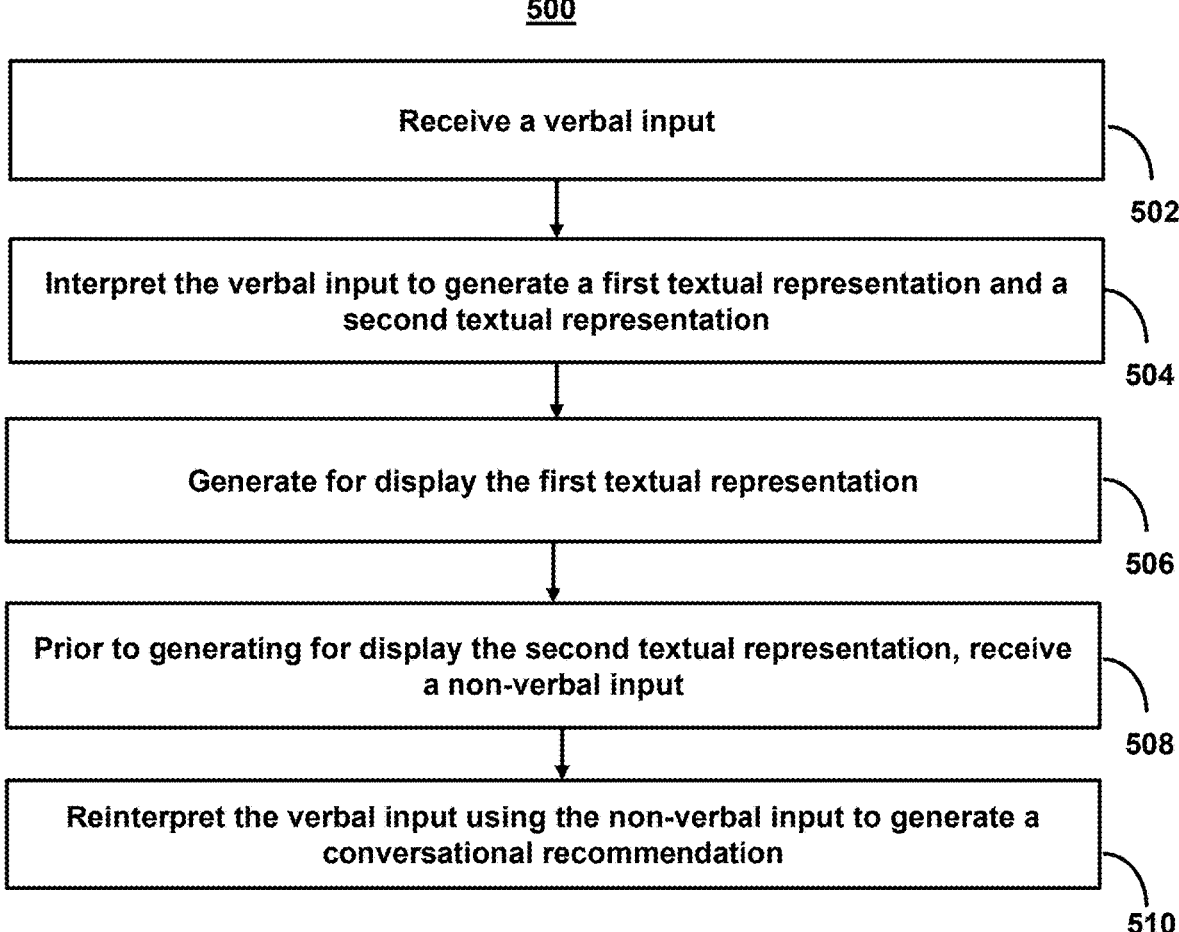

500

Receive a verbal input

502

Interpret the verbal input to generate a first textual representation and a second textual representation

504

Generate for display the first textual representation

506

Prior to generating for display the second textual representation, receive a non-verbal input

508

Reinterpret the verbal input using the non-verbal input to generate a conversational recommendation

SYSTEMS AND METHODS FOR ALTERNATIVE CONTENT RECOMMENDATIONS BASED ON ANALYZING POTENTIAL INTERPRETATIONS USING SUPPLEMENTAL INPUTS

BACKGROUND

In recent years, the amount and use of interactive programs has risen considerably. In tandem with this rise is the need to have human-like interactions and/or create applications that mimic the tone, cadence, and/or speech patterns of humans. Additionally, in order to fulfill user-interaction requirements, these applications need to be helpful and thus respond intelligently by providing relevant recommendations corresponding to initial user inputs, whether these inputs are received via text, audio, or video input.

Once such manner for generating relevant recommendations and otherwise aiding users is to provide autocomplete functionality. Autocompletion is a feature in software applications that automatically suggests or completes a word or phrase as a user types. It is designed to enhance the user experience by predicting and providing relevant text based on the input entered by the user. Autocompletion is performed through algorithms, models, and/or artificial intelligence, including, but not limited to, machine learning, deep learning, etc. (referred to collectively herein as artificial intelligence models, machine learning models, or simply models) that analyze input data to predict and suggest the most likely next word or phrase based on the context.

Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time consuming. Additionally, data that is obtained may need to be categorized and labeled accurately, which can be difficult, time consuming, and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in mimicking human-like interactions and/or create applications that mimic the tone, cadence, and speech patterns of humans.

SUMMARY

Systems and methods are described herein for generating dynamic conversational recommendations. Conversational recommendations include communications between a user and a system that may maintain and/or facilitate (e.g., via autocomplete functionality) a conversational tone, cadence, and/or speech pattern of a human during an interactive exchange between the user and the system. In particular, systems and methods are described herein for novel uses and/or improvements to artificial intelligence applications used to generate suggested dynamic conversational recommendations based on initial user inputs (e.g., such as autocomplete functionality).

For example, the system may respond to one or more user actions (or inactions). In order to maintain the conversational tone, the system must generate recommendations that are both timely and pertinent (e.g., in a dynamic fashion). This requires the system to determine both quickly (i.e., in real time or near real time) and accurately the intent, goal, and/or motivation behind a user input. These user inputs or actions may take various forms including speech commands, textual inputs, recommendations to system queries, and/or other user actions. In each case, the system must aggregate information about the user actions in order to determine a likely intent of the user.

Existing systems may perform this functionality based on an artificial intelligence model. For example, a model may receive a few initial characters (e.g., in a text input) and then suggest a recommendation (or autocompletion of a word based on the initial characters). However, these models face several technical problems. First, the model may struggle when there are multiple possible outputs for a given input. If the context is unclear or if there are numerous potential matches, the system might provide suggestions that are not what the user intended. Such a result is common in instances where the system relies only on an input of initial characters. Secondly, models can inadvertently perpetuate or reinforce biases present in the training data. If the model has been exposed to biased language or information during training, it may generate biased suggestions, potentially reinforcing stereotypes or discriminatory patterns. Similarly, models may struggle with specialized or domain-specific vocabulary that is not well-represented in their training data. This can result in suboptimal suggestions for certain fields or industries. Such results may be apparent if the model relies on publicly available training data (e.g., typically based on general terminology libraries), data not customized to a user, application, and/or use, and/or data limited to one input type (e.g., textual inputs).

As yet another technical issue, models may make inaccurate predictions, leading to unintended or incorrect suggestions. This can result in frustration for users who may have to correct the system's mistakes. Such frustration may be particularly apparent to users that rely on dictation (e.g., verbal inputs that are subsequently converted to textual inputs) as an increase in the speed of inputs based on the dictation is negated by the need of the user to backtrack and edit inaccuracies in the dictation.

To overcome these technical deficiencies in adapting artificial intelligence models for this practical benefit, systems and methods disclosed herein increase the amount and type of data that may be used by the artificial intelligence model both in training and in distinguishing between inputs. For example, by expanding the amount of data available to the model (both in training and in distinguishing between inputs), the model is less susceptible to ambiguity arising when generating conversational recommendations. Specifically, the model may use multi-modal training data (e.g., training data comprising historical textual data and data corresponding to supplemental inputs). The model may also generate conversational recommendations based on this multi-modal data. That is, the system may use models trained both on textual data and/or other supplemental inputs (e.g., audio tone, application type, facial expression, eye gaze, and/or other biometrics) to make a determination of what content to populate in conversational recommendations.

However, in many instances, training data of one type (e.g., textual data) may be more abundant than training data of another type (e.g., gaze point data), and accordingly, the system may need to use a specialized training architecture to ensure that the abundancy of one type of training data does not bias the other, more limited training data during training. In particular, the system may train models separately on the various types of data. Additionally, the system may train a model on the more limited type of data to predict modifications to the recommendations of the more abundant type of data (e.g., as opposed to generating independent predictions). By doing so, the system may leverage the more abundant training data of the first type while still gaining situational benefits of the training based on the second.

In some aspects, systems and methods for expanding available training data for artificial intelligence models used to generate conversational recommendations are described. For example, the system may receive a first textual input from a user in a first user interface. In response to receiving the first textual input, the system may generate for display, in the first user interface, the first textual input and determine a first output, from a first artificial intelligence model, based on the first textual input, wherein the first output comprises a predicted completed portion based on a seed portion detected in the first textual input, and wherein the first artificial intelligence model is trained to generate first outputs, wherein the first outputs predict respective completed portions based on respective seed portions at respective times during respective conversational interactions. The system may receive a first supplemental input from the user in response to generating for display, in the first user interface, the first textual input. The system may determine a second output, from a second artificial intelligence model, based on the first output and the first supplemental input, wherein the second artificial intelligence model is trained to generate second outputs, wherein the second outputs predict modifications to the respective completed portions based on respective supplemental inputs at the respective times during the respective conversational interactions. The system may generate a modified completed portion based on the second output. The system may generate for display, in the first user interface, the modified completed portion.

Moreover, in addition to expanding the amount of data available to the model (both in training and in distinguishing between inputs), the model uses that data in an unconventional manner. Specifically, the model disambiguates inputs into serial portions and generates a first feature input for the model (e.g., used to generate a conversational recommendation) based on a predicted seed portion. While the predicted seed portion is displayed (e.g., in a user interface), the model generates a second feature input based on a predicted completed portion as well as data from the supplemental input, wherein the supplemental input is received during display of the predicted first portion in a user interface. The model may then generate a first output, wherein the first output comprises an interpretation of the second portion based on the second feature input. The system may then combine the first output with the first feature input to generate a second output that interprets the first portion. Based on the second output, the system may modify the predicted first portion as displayed.

In some aspects, systems and methods for generating conversational recommendations using non-serialized interpretations of serialized inputs are described. For example, the system may receive a first verbal input, at a first user interface from a user, wherein the first verbal input comprises a serialized input featuring a first portion and a second portion. The system may interpret the first portion and the second portion in order to generate a first textual representation corresponding to the first portion and a second textual representation corresponding to the second portion. The system may generate for display, in the first user interface, the first textual representation. Prior to generating for display, in the first user interface, the second textual representation, the system may receive a first supplemental input from the user, wherein the first supplemental input is a non-verbal input. The system may reinterpret the first portion, based on the first supplemental input and the second textual representation, to generate a third textual representation corresponding to the first portion. The system may reinterpret the second portion, based on the third textual representation, to generate a fourth textual representation corresponding to the second portion. The system may generate for display, in the first user interface, a conversational recommendation corresponding to the first verbal input based on the third textual representation and the fourth textual representation.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

FIGS. 1A-C show an illustrative diagram for a user interface for suggested dynamic conversational recommendations, in accordance with one or more embodiments.

FIGS. 2A-B show an illustrative diagram for a system for generating dynamic conversational recommendations, in accordance with one or more embodiments.

FIG. 5 shows a flowchart of the steps involved in generating conversational recommendations, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
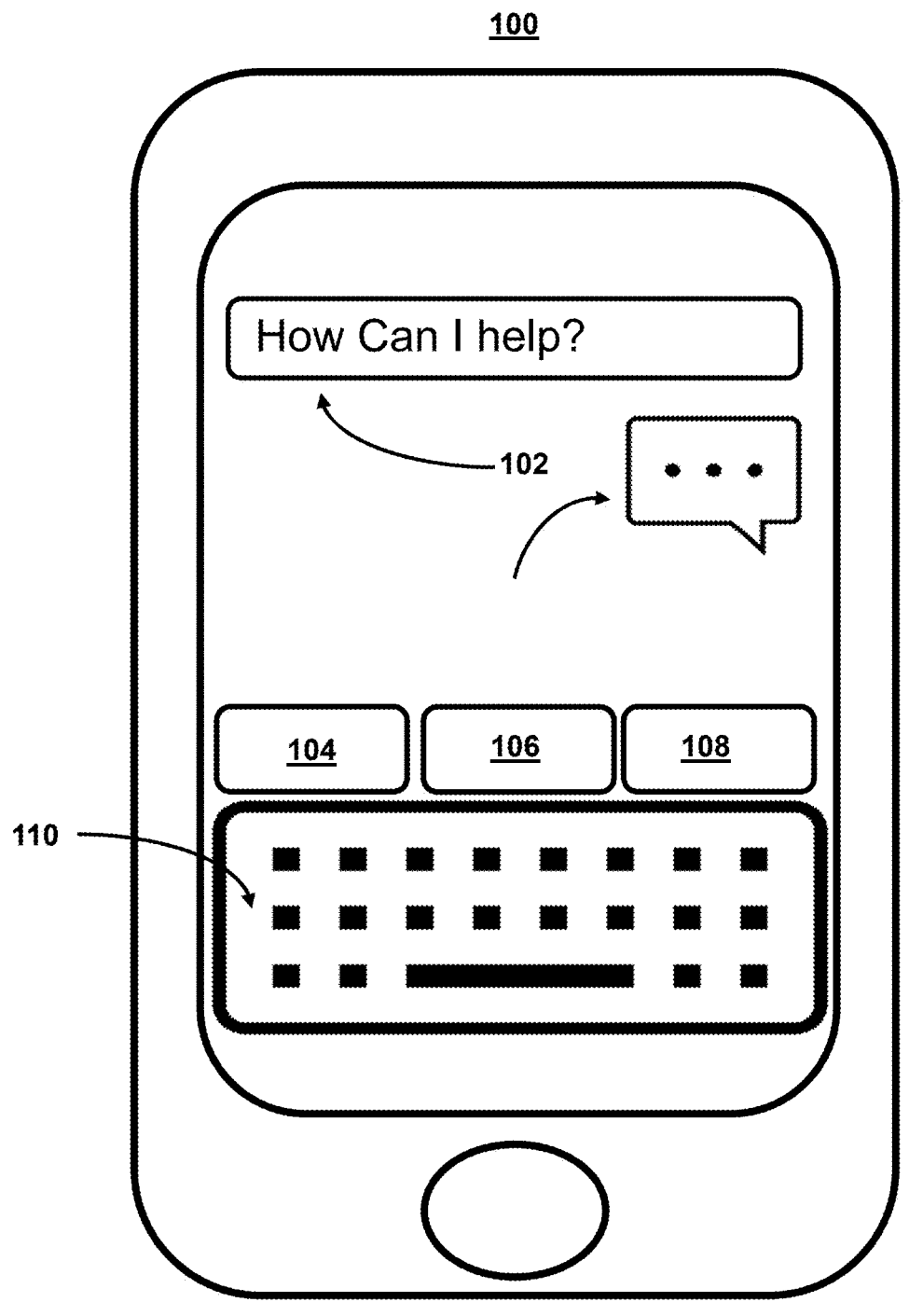
Figure 1B:
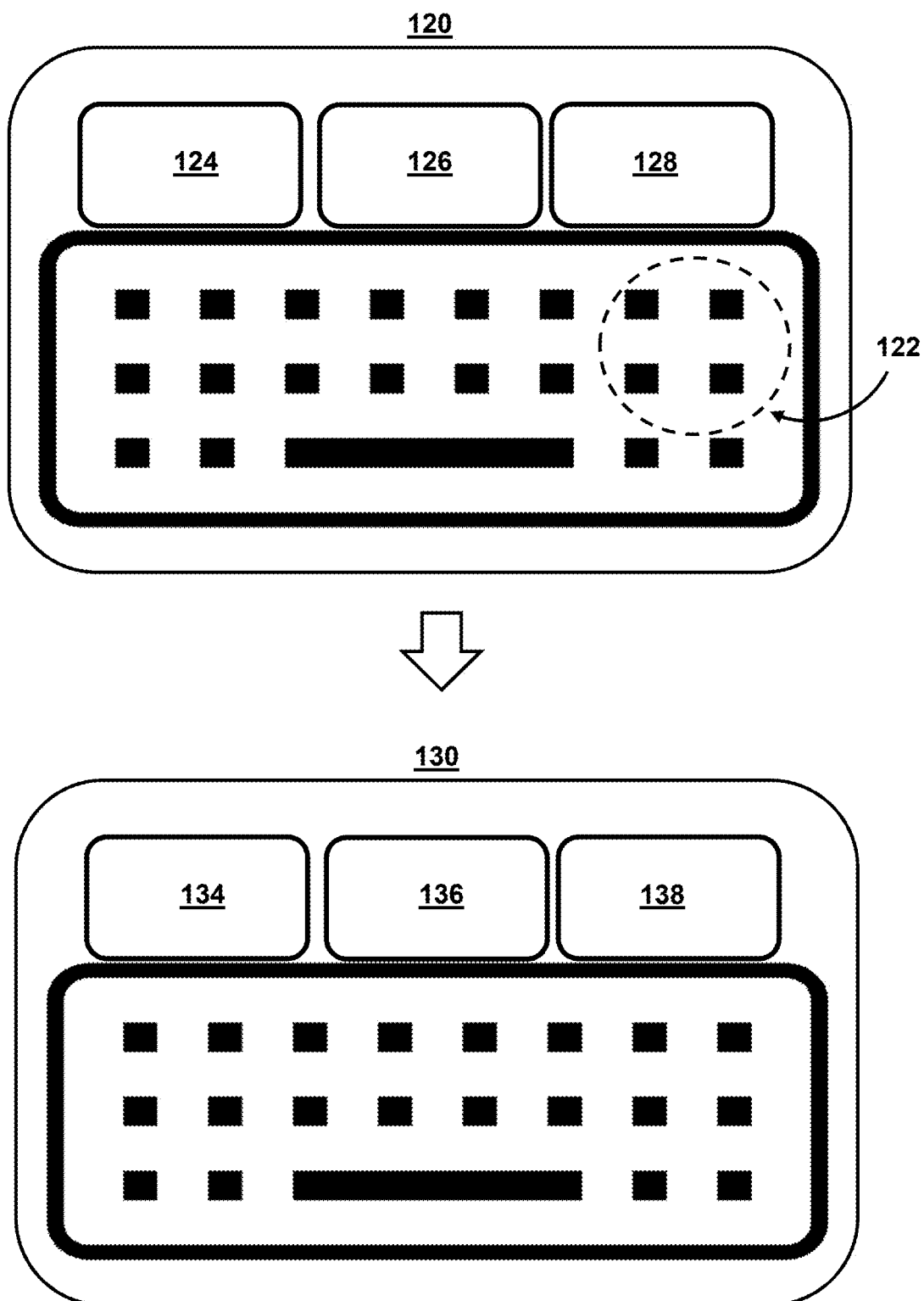
Figure 1C:
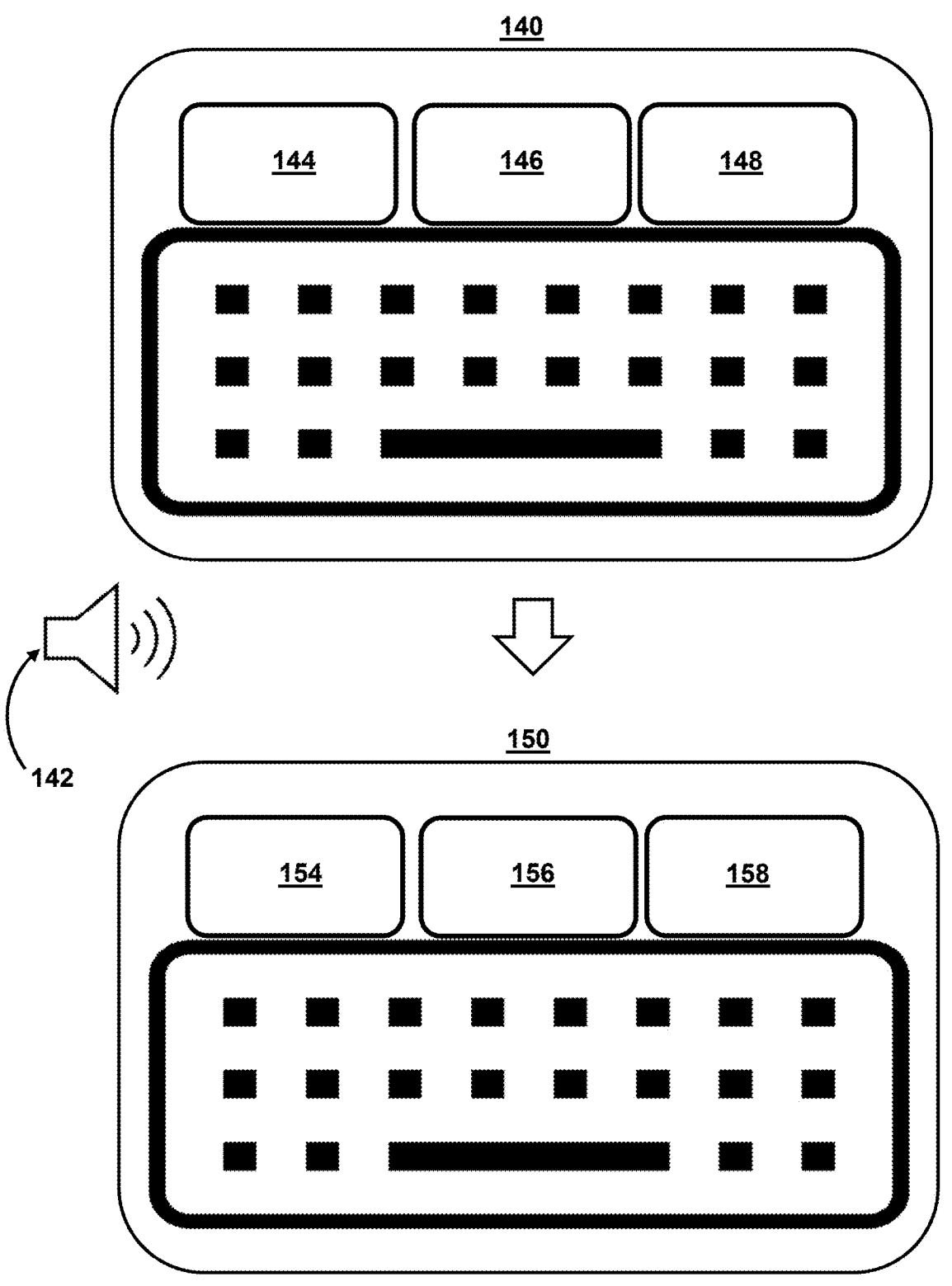

FIGS. 1A-C show an illustrative diagram for a user interface for suggested dynamic conversational recommendations, in accordance with one or more embodiments. For example, FIGS. 1A-C may represent the process of generating conversational recommendations. For example, user interface 100 may display a user interacting with the user interface and conversational recommendations based on user inputs of one or more types. As referred to herein, a "user interface" may comprise a human-computer interaction and communication in a device, and may include display screens, keyboards, a mouse, and the appearance of a desktop. For example, a user interface may comprise a way a user interacts with an application or a website.

FIG. 1A shows an illustrative diagram for a conversational interaction, in accordance with one or more embodiments. For example, user interface 100 includes content 102. As referred to herein, "content" should be understood to mean an electronically consumable user asset, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

Based on content 102 and/or one or more user inputs into alphanumeric input area 110, the system may generate conversational recommendation 104, conversational recommendation 106, and conversational recommendation 108. An alphanumeric input area in a user interface may be a field or section where users can input characters, typically including letters, numbers, and certain special characters. This type of input area is commonly found in forms, search bars, text editors, and other interactive elements where users need to provide textual information. A text field may comprise single-line or multi-line input areas where users can type alphanumeric characters. Search bars may comprise areas in which users can enter search queries composed of alphanumeric characters to find specific information within a system or application.

A conversational recommendation may comprise content that encourages users to engage with the user interface, application, and/or autocomplete feature by providing a prompt to assist the user in their interaction with the user interface. In some embodiments, the conversational recommendation may comprise a suggestion (or portion thereof) from an autocomplete feature. An autocomplete feature may be a functionality found in search bars, text editors, messaging applications, and other user interfaces where users input text. The feature suggests completions or predictions based on the characters that the user has typed so far (and/or other supplemental inputs as described herein). It aims to assist users by reducing the effort required to type repetitive or commonly used phrases, words, and/or commands as well as correct errors in dictation and/or typing. For example, when a user begins typing in a text field, the autocomplete feature dynamically displays a drop-down menu or list of suggestions based on the input provided. These suggestions are typically derived from a database of frequently used terms, previous searches, or contextually relevant options.

The system may receive user inputs of various types. The system can support various types of inputs to facilitate interactions with users. The system may generate conversational recommendations based on the input types.

FIG. 1B shows an illustrative diagram for using supplemental inputs to reinterpret conversational recommendations, in accordance with one or more embodiments. For example, FIG. 1B may include user interface 120 (or a portion thereof) and user interface 130 (or a portion thereof). For example, as shown in FIG. 1B, user interface 130 may generate conversational recommendation 124, conversational recommendation 126, and conversational recommendation 128. Conversational recommendation 124, conversational recommendation 126, and conversational recommendation 128 may correspond to a portion of a serialized input received from a user. For example, the system may detect a seed portion in a given input and determine a plurality of completed portions (e.g., conversational recommendation 124, conversational recommendation 126, and conversational recommendation 128) based on the seed portion.

As described herein, a "seed" portion refers to a portion of a user input used to determine potential completed portions. For example, the seed portion may refer to the initial part of the input text that the autocomplete algorithm uses to generate suggestions. When a user starts typing in an autocomplete-enabled input field, the characters they input initially form the seed portion. This seed portion is used by the autocomplete algorithm to generate relevant suggestions. The autocomplete algorithm analyzes the seed portion to predict what the user might be trying to type or search for. It then generates a list of suggestions based on this analysis. The generated suggestions are presented to the user in a drop-down menu or similar interface element. The user can then select one of the suggestions, if it matches what they were intending to type, or continue typing to refine their input. For example, if a user starts typing "app" into a search bar, "app" would be the seed portion. The autocomplete feature might then suggest completions like "apple," "application," or "appointments" based on common search terms or previous user inputs.

As shown in user interface 120, the system may also detect a supplemental input (e.g., supplemental input 122). As described herein, a supplemental input is an input of a different type than a primary input. For example, if a primary input is a textual input, the system may detect a supplemental input comprising verbal data. Additionally or alternatively, a supplemental input is an input that is received in response to the display of content generated based on the primary input.

For example, as shown in user interface 120, in response to conversational recommendation 124, conversational recommendation 126, and conversational recommendation 128 being displayed, the system may detect a gaze input (e.g., supplemental input 122) of a user gazing at a particular portion of an alphanumeric keyboard. The system may interpret this gaze to suggest that additional characters (e.g., appended to conversational recommendation 124, conversational recommendation 126, and conversational recommendation 128) are found in this area. For example, as shown in user interface 130, the system may use the supplemental input to generate conversational recommendation 134, conversational recommendation 136, and conversational recommendation 138.

FIG. 1C shows an illustrative diagram for using supplemental inputs to reinterpret conversational recommendations, in accordance with one or more embodiments. In another example, as shown in user interface 140, in response to conversational recommendation 144, conversational recommendation 146, and conversational recommendation 148 being displayed, the system may detect a verbal input (e.g., supplemental input 142) of a user in response to the display of one or more conversational recommendations. For example, in response to conversational recommendation 144, conversational recommendation 146, and conversational recommendation 148 being displayed, a user may utter a word (e.g., "ugh," "no," etc.) that indicates a particular one of the conversational recommendations is incorrect. The system may use this information to generate modified conversational recommendation 154, conversational recommendation 156, and conversational recommendation 158 as shown in user interface 150.

In another example, in response to conversational recommendation 144, conversational recommendation 146, and conversational recommendation 148 being displayed, a user may otherwise change characteristics of an input that indicates a particular one of the conversational recommendations is incorrect. For example, the system may determine that the rate of entry (e.g., how quickly a use types textual inputs, speaks verbal inputs, etc.) changes in response to displaying conversational recommendations. The system may use this information to generate modified conversational recommendation 154, conversational recommendation 156, and conversational recommendation 158. For example, in response to incorrect conversational recommendations, the user may pause a textual input in order to correct the error.

Figure 2A:
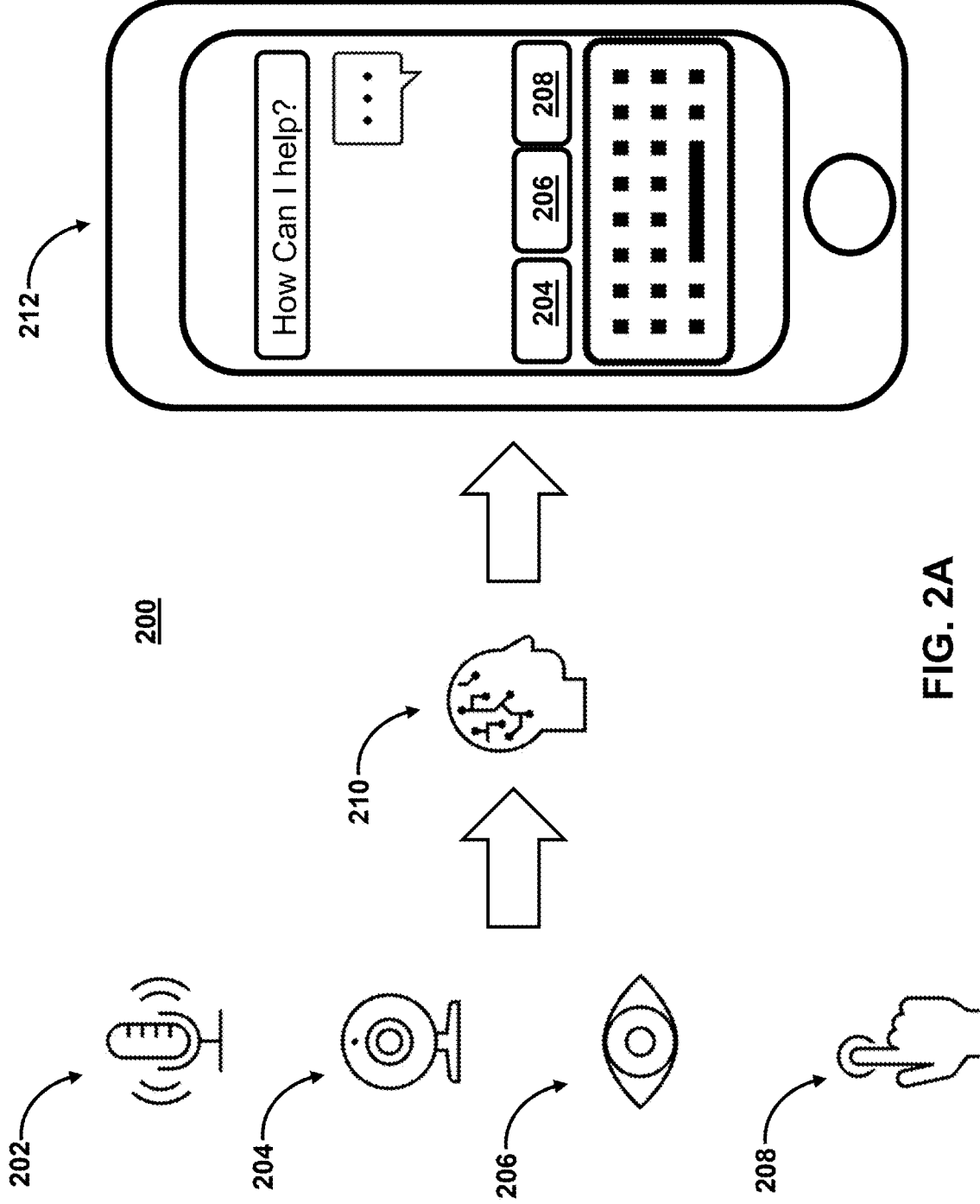
Figure 2B:
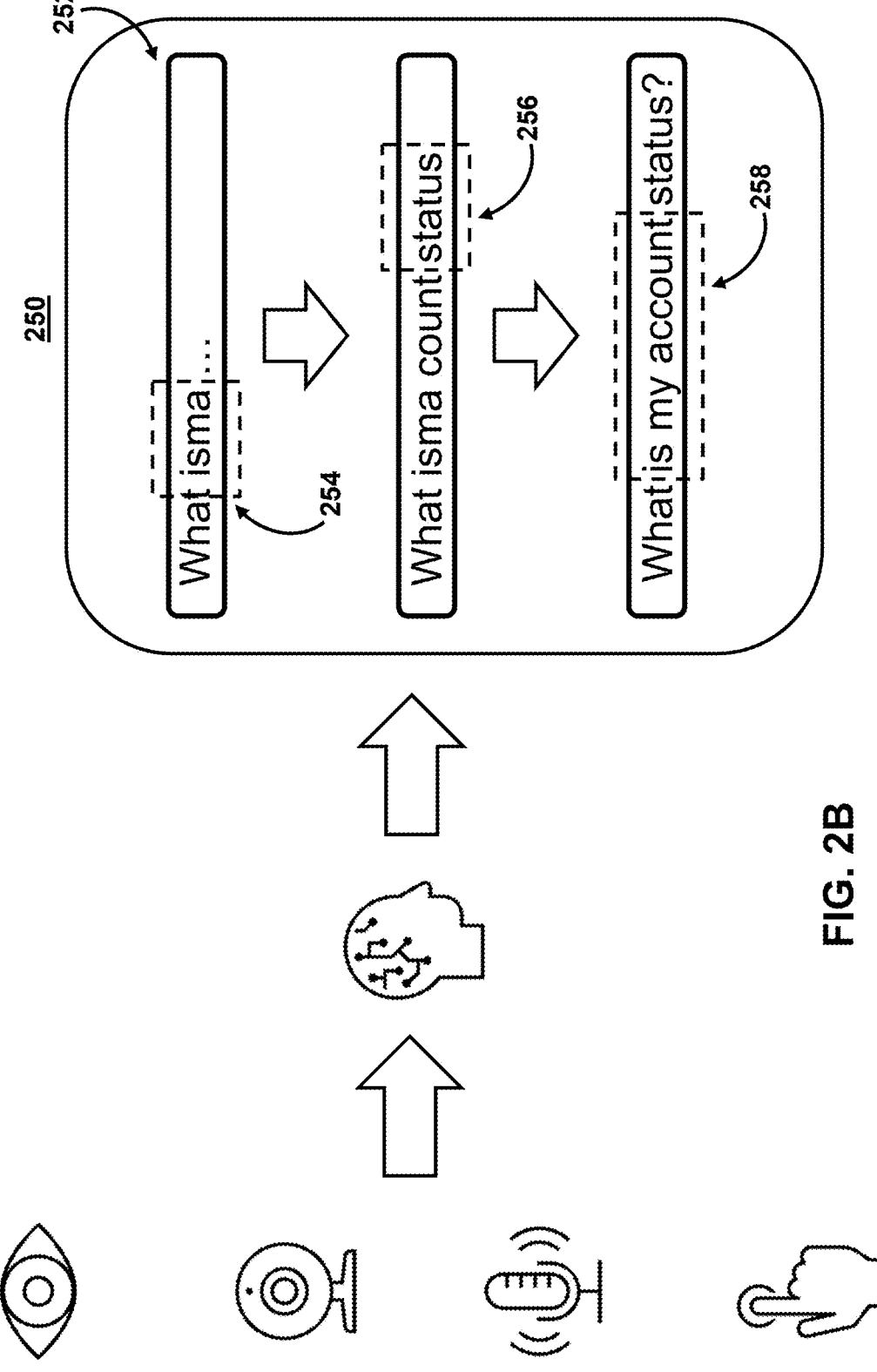

FIGS. 2A-B show an illustrative diagram for a system for generating dynamic conversational recommendations, in accordance with one or more embodiments. FIG. 2A shows an illustrative diagram for receiving user inputs of different types, in accordance with one or more embodiments. For example, FIG. 2A shows system 200.

The system may receive user inputs of various types. The system can support various types of inputs to facilitate interactions with users. One type of input may be a text input, where users type messages or queries using text. Another type of input may be a verbal (or voice) input, where users speak to the system using speech recognition technology. For example, the system may receive verbal input 202. Verbal inputs can enhance accessibility and convenience, particularly for users who prefer not to type or have mobility impairments. Another type of input may be buttons, user selections of pop-ups, and/or quick replies. For example, the system may receive tactic input 208. For example, the system can present users with predefined options or buttons that users can click or tap to select. This simplifies the interaction process and helps guide users through conversation flows. Another type of input may be images and multimedia. Users can send images, videos, or other multimedia files to the system. The system may likewise obtain an image input (e.g., input image 204) from a camera. This type of input can be useful for tasks such as image recognition, product identification, or multimedia content browsing. Another type of input may be a location input. Users can share their location with the system, allowing it to provide location-based services or information tailored to the user's geographic location. Another type of input may be a file upload. Users can upload files such as documents, spreadsheets, or images to the system. This enables users to share relevant information or documents with the system for processing or analysis. Another type of input may be an emoji and/or sticker. For example, users can use emojis, stickers, and/or other graphical elements to express emotions or convey messages. This may include support for emojis and stickers that can make interactions with the system more engaging and expressive. Another type of input may be structured inputs. Users can provide structured inputs in the form of forms or structured data. The systems can parse these inputs and extract relevant information to fulfill user requests or provide personalized responses.

Another type of input may be a biometric input. Biometric input may refer to the use of unique biological characteristics or behavioral traits of individuals as a means of authentication or identification in a system. These biometric identifiers are distinctive to each person and can include physiological traits such as fingerprints, iris patterns, facial features, hand geometry, and voice patterns, as well as behavioral traits such as typing rhythm, gait, and signature dynamics.

To process biometric inputs, the system may capture biometric data from the user. For example, fingerprint scanners capture the unique patterns of ridges and valleys on a person's fingertip. In another example, iris scanners capture the unique patterns in the colored part of a person's eye. In another example, facial recognition systems capture and analyze the unique features of a person's face, such as the distance between the eyes or the shape of the nose. In another example, voice recognition systems capture and analyze the unique characteristics of a person's voice, including pitch, tone, and frequency.

Once biometric data is captured, it is preprocessed to remove noise and inconsistencies. Then, relevant features are extracted from the biometric data to create a unique digital representation, often referred to as a biometric template or biometric signature. The system may generate a biometric template from the user's biometric data that is securely stored in a database along with the user's identity information. This allows the system to later compare incoming biometric data against the stored templates for authentication purposes. When a user attempts to access the system, they provide their biometric input (e.g., fingerprint, iris scan, facial scan, voice sample). The system captures this input and processes it to create a digital representation similar to the enrolled templates. The system compares the newly captured biometric data with the stored templates in its database, using algorithms specifically designed for biometric matching. The goal is to find a match or similarity score between the captured biometric data and one or more enrolled templates. Based on the matching results, the system makes a decision about whether the captured biometric input sufficiently matches any of the enrolled templates. If a match is found and the similarity score meets a predefined threshold, the user is authenticated and granted access to the system. If no match is found or the similarity score is too low, access may be denied. The user interface provides feedback to the user regarding the outcome of the authentication process. This can include notifications indicating successful authentication or prompts for reauthentication if the input was not recognized.

Another type of input may be a gaze input. For example, gaze input 206. Gaze input may refer to a method of interacting with a device or interface using the direction of a user's gaze or eye movements as an input signal. Instead of using traditional input devices such as keyboards, mice, or touchscreens, users can control the device or perform actions simply by looking at specific areas on the screen or interface. Gaze input may involve the use of eye-tracking devices or sensors that monitor the position, movement, and focus of a user's eyes. These devices can detect where a user is looking and translate that information into actionable commands or inputs for the system.

For gaze input, the process begins with the use of eye-tracking hardware or sensors, such as specialized cameras or infrared sensors, that are capable of monitoring the movement and focus of a user's eyes. These devices track the position of the user's gaze in real time. Before using gaze input, the system may require calibration to accurately determine the user's gaze direction relative to the screen or interface. Calibration involves asking the user to look at specific points on the screen while the system records their eye movements. This process helps the system establish a baseline for accurate gaze tracking. Once the system is calibrated, it continuously monitors the user's eye movements and detects the direction of their gaze. This information is typically represented as a point on the screen where the user is looking. The system maps the user's gaze position to the relevant elements or controls within the user interface. For example, if the user looks at a button or menu item, the system identifies that interaction point. Based on the detected gaze position, the system can trigger interactions with interface elements such as buttons, menus, or interactive objects. For instance, if the user looks at a specific button for a certain duration, the system may interpret this as a selection or activation command. The user interface provides feedback to the user to indicate that their gaze input has been recognized and processed. This feedback can take various forms, such as highlighting selected items, displaying tooltips, or triggering visual or auditory cues. Gaze input can be used for continuous interaction with the interface, allowing users to navigate menus, scroll through content, make selections, and perform other actions by simply directing their gaze.

The system may receive this information at model 210 to generate content in user interface 212. For example, model 210 may comprise an artificial intelligence model used to generate conversational recommendations and autocomplete suggestions based on historic textual and verbal inputs. For example, the system may gather a large dataset of historic textual and verbal inputs. This dataset may include conversations, written text from various sources, customer interactions, user queries, and other relevant data. The dataset should cover a wide range of topics and scenarios to ensure the model learns diverse patterns and language use. The system may preprocess the dataset to clean and normalize the text. This may involve removing noise, such as special characters or irrelevant information, correcting spelling errors, tokenizing the text into individual words or tokens, and encoding the text into a numerical format that can be understood by model 210.

The system may choose an appropriate model architecture. For conversational recommendation and autocomplete suggestions, models such as recurrent neural networks (RNNs), long short-term memory networks (LSTMs), transformer-based models like GPT (Generative Pre-trained Transformer), or BERT (Bidirectional Encoder Representations from Transformers) are commonly used due to their ability to capture contextual information and generate coherent text. The system may train the selected model on the preprocessed dataset. During training, the model learns to understand the relationships between input text and the corresponding recommendations or autocomplete suggestions. The training process may involve adjusting the model's parameters to minimize the difference between the predictions generated by the model and the actual recommendations or suggestions in the training data.

The system may validate the trained model on a separate validation dataset to assess its performance and identify areas for improvement. The system may fine-tune the model by adjusting hyperparameters, architecture, or training strategies to optimize its performance. The system may evaluate the trained model on a test dataset to measure its performance in generating accurate and relevant recommendations or autocomplete suggestions. The system may use evaluation metrics that include accuracy, precision, recall, and F1-score. Once the model has been trained and evaluated satisfactorily, the system may deploy it into production systems where it can generate conversational recommendations and autocomplete suggestions in real time based on user inputs. The system may continuously monitor the performance of the deployed model in real-world scenarios and collect feedback from users. The system may iterate on the model by retraining it with updated datasets or fine-tuning strategies to adapt to changing user preferences and language patterns.

FIG. 2B shows an illustrative diagram for generating conversational recommendations using non-serialized interpretations of serialized inputs, in accordance with one or more embodiments. For example, as shown in FIG. 2B, user interface 250 may include content generated by the system. In particular, the system may use non-serialized interpretations of user inputs to generate conversational recommendation and/or autocomplete suggestions. For example, the system may use a user input that is received later in time to interpret a user input received earlier in time.

As shown in user interface 250, the system may receive user input 254 as part of serialized input 252. As the system continues to receive serialized input 252, the system may receive user input 256. The system may use user input 256 to reinterpret a portion of serialized input 252 that includes user input 254. The system may then generate this modified completed portion (e.g., portion 258) in user interface 250.

To use non-serialized interpretations of user inputs to generate conversational recommendations and/or autocomplete suggestions, the system can employ techniques that involve context-aware processing and understanding of user interactions. For example, the system maintains a contextual understanding of the conversation by tracking previous user inputs and system responses. This context includes not only the immediate preceding input, but also a broader history of interactions within the conversation session. When a user provides an input, the system interprets it in real time and generates an initial response or recommendation based on the current context. However, instead of treating each input in isolation, the system also considers the potential relevance of subsequent inputs to refine its interpretation of earlier inputs. As new inputs are received from the user, the system dynamically updates its interpretation of previous inputs based on the temporal context provided by subsequent interactions. This allows the system to incorporate later inputs into the interpretation of earlier inputs, leading to more accurate recommendations or autocomplete suggestions.

The system may employ techniques such as recurrent RNNs or transformer-based architectures to model temporal dependencies in user interactions. These models can capture the sequential nature of conversations and learn to leverage information from both past and future inputs to improve the understanding of current inputs. Based on the refined interpretation of user inputs using temporal context, the system generates adaptive responses or suggestions that take into account the evolving conversation dynamics. These responses can be dynamically adjusted as new inputs are received, ensuring that the system remains responsive and contextually relevant throughout the interaction.

The system may also incorporate feedback mechanisms to validate the relevance and effectiveness of its responses. Users can provide feedback on the accuracy and usefulness of recommendations or autocomplete suggestions, which the system can use to further refine its interpretation and response generation strategies over time.

Figure 3:
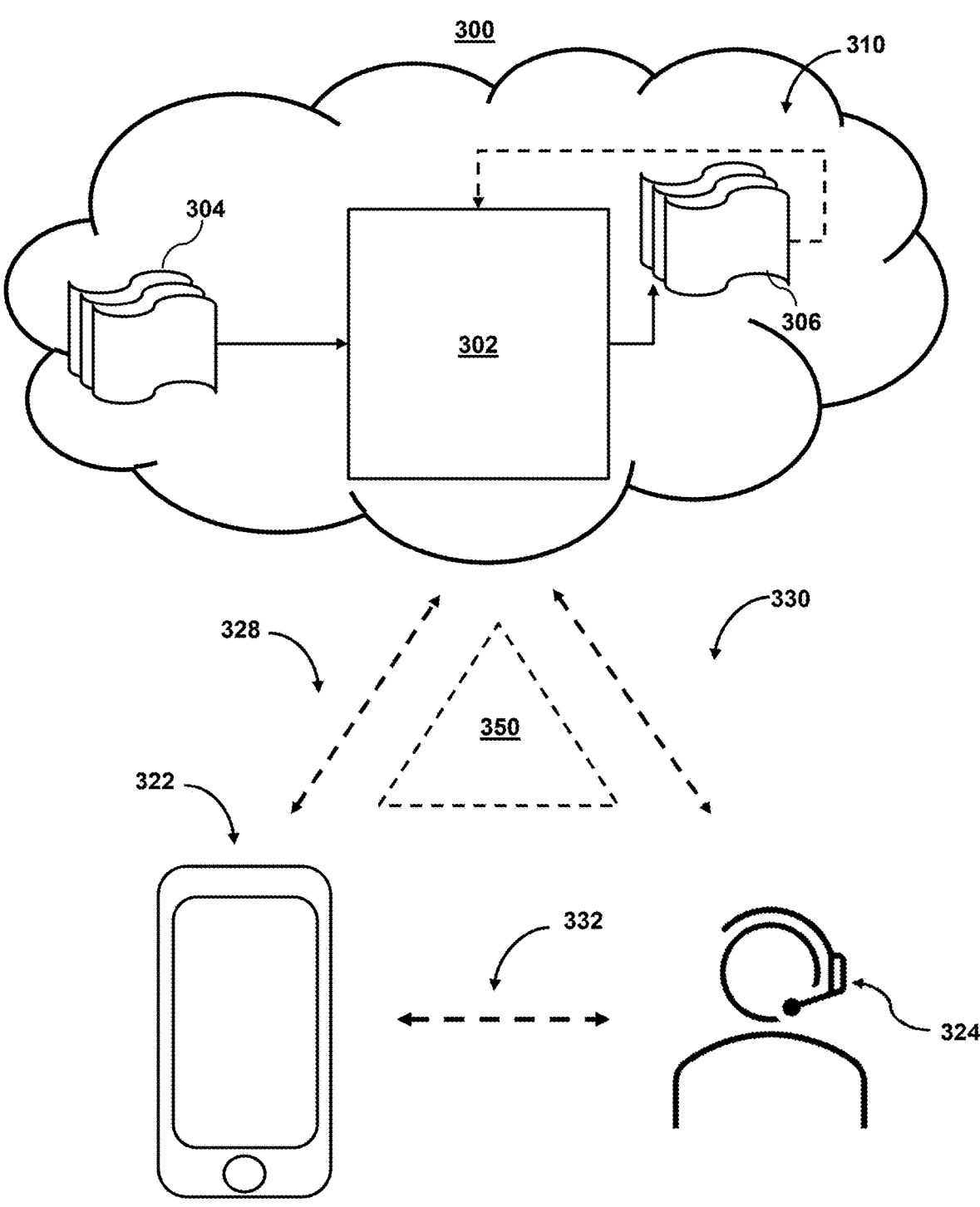
FIG. 3 shows illustrative components for a system used to generate dynamic conversational recommendations, in accordance with one or more embodiments.

FIG. 3 shows illustrative components for a system used to generate dynamic conversational recommendations, in accordance with one or more embodiments. For example, FIG. 3 may show illustrative components that expand available training data for artificial intelligence models used to generate conversational recommendations. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational recommendation, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., one or more completed portions based on an inputted seed portion and/or any supplemental inputs).

For example, the system may receive a first set of training data, wherein the first set of training data comprises textual inputs into respective user interfaces at respective times during respective conversational interactions, wherein the first set of training data comprises respective seed portions and respective completed portions for each of the textual inputs. The system may also receive a second set of training data, wherein the second set of training data comprises respective supplemental inputs into the respective user interfaces at the respective times during the respective conversational interactions, and wherein the respective supplemental inputs are non-textual inputs. The system may train, based on the first set of training data, a first artificial intelligence model to generate first outputs, wherein the first outputs predict the respective completed portions based on the respective seed portions at the respective times during the respective conversational interactions. The system may train, based on the second set of training data, a second artificial intelligence model to generate second outputs, wherein the second outputs predict modifications to the respective completed portions based on the respective supplemental inputs at the respective times during the respective conversational interactions.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., one or more completed portions based on an inputted seed portion and/or any supplemental inputs).

In some embodiments, the model (e.g., model 302) may automatically perform actions based on outputs 306. In some embodiments, the model (e.g., model 302) may not perform any actions. The output of the model (e.g., model 302) may be used to determine one or more completed and/or modified completed portions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
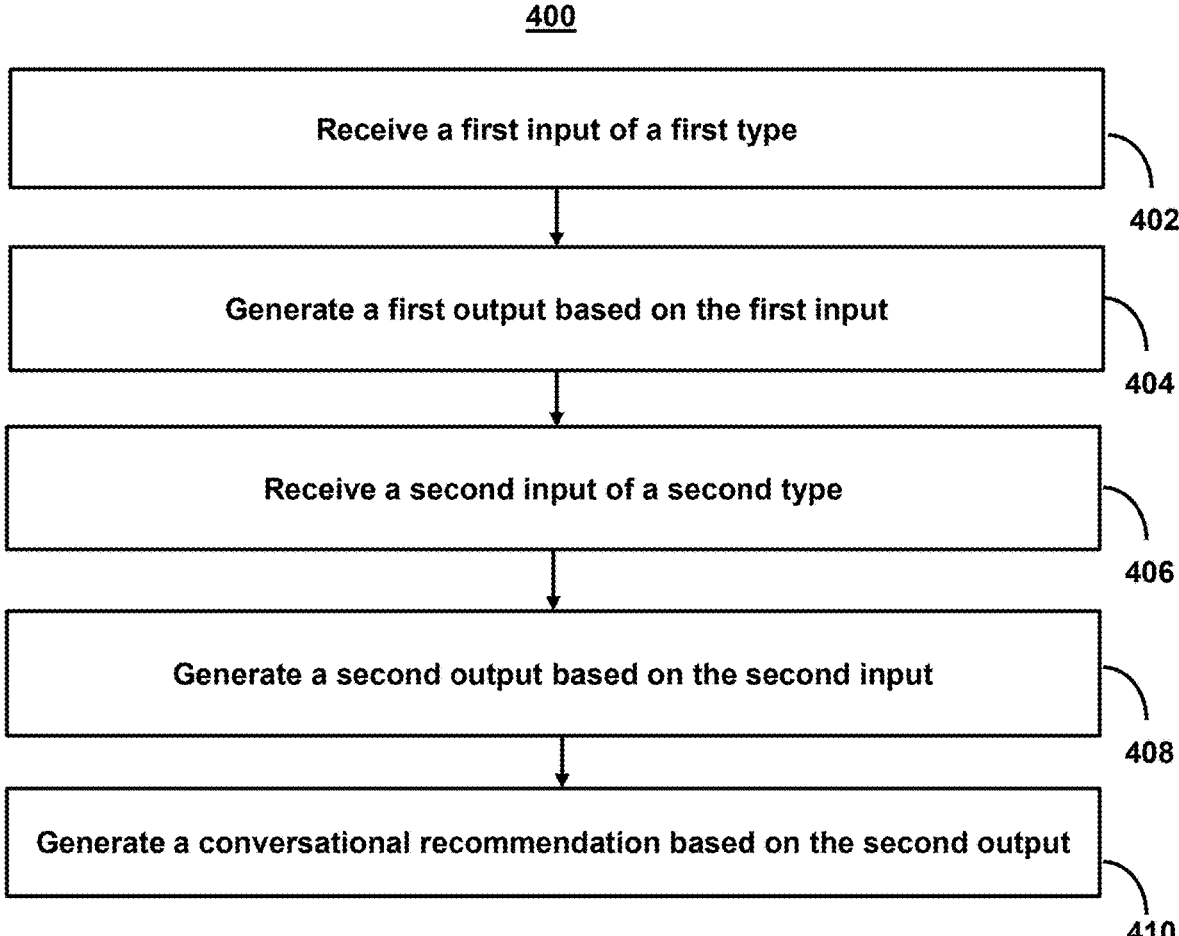
FIG. 4 shows a flowchart of the steps involved in expanding available training data for artificial intelligence models, in accordance with one or more embodiments.

FIG. 4 shows a flowchart of the steps involved in expanding available training data for artificial intelligence models, in accordance with one or more embodiments. For example, the system may use process 400 (e.g., as implemented on one or more system components described above) in order to expand available training data for artificial intelligence models used to generate conversational recommendations.

At step 402, process 400 (e.g., using one or more components described above) may receive a first input of a first type. For example, the system may receive a first textual input from a user in a first user interface.

At step 404, process 400 (e.g., using one or more components described above) may generate a first output based on the first input. For example, the system may perform one or more functions or software workflows in response to receiving a user input. For instance, the system may generate for display, in the first user interface, the first textual input. Additionally or alternatively, the system may determine a first output from a first artificial intelligence model, based on the first textual input, wherein the first output comprises a predicted completed portion based on a seed portion detected in the first textual input, and wherein the first artificial intelligence model is trained to generate first outputs, wherein the first outputs predict respective completed portions based on respective seed portions at respective times during respective conversational interactions.

At step 406, process 400 (e.g., using one or more components described above) may receive a second input of a second type. For example, the system may receive a first supplemental input from the user in response to generating for display, in the first user interface, the first textual input.

In some embodiments, receiving the first supplemental input from the user in response to generating for display, in the first user interface, the first textual input may comprise detecting a gaze location on the first user interface. For example, receiving the first supplemental input from the user in response to generating for display, in the first user interface, the first textual input may comprise detecting a gaze location on the first user interface. The system may determine that the gaze location corresponds to a character in an alphanumeric character selection portion of the first user interface and/or a textual input. For example, upon detecting the gaze location, the system determines if it corresponds to a character in an alphanumeric character selection portion of the first user interface (or a textual input generated for display in the user interface). This portion may contain a grid or list of characters (or a conversational recommendation) from which the user can select. The system may generate a feature input for the second artificial intelligence model based on the character (or textual input) and the first output. For example, based on the detected gaze location and corresponding character selection, the system generates a first textual input. This input could be a single character or a sequence of characters that represent the user's selection. The system may determine that the gaze location corresponds to a character in an alphanumeric character selection portion of the first user interface. The system may generate a feature input for the second artificial intelligence model based on the character and the first output. For example, when using the first textual input, the system passes it through an artificial intelligence model. This model could be trained for tasks such as text generation, language understanding, or context prediction. The model processes the input and generates an output, which could be a suggestion, recommendation, completion, or any other relevant response based on the context of the conversation or task. The system displays the first output generated by the model on the first user interface. This could be presented as a suggestion, autocomplete option, or any other relevant form of feedback to the user. After displaying the first output, the system waits for the user to provide a supplemental input in response. This input could be a confirmation, correction, elaboration, or any other form of feedback or interaction related to the first output. Once the first supplemental input is received, the system generates a feature input for the second artificial intelligence model. This feature input could include information such as the character selected by the user, the first output generated by the first model, and any additional context or metadata relevant to the conversation or task. The second model processes the feature input generated by the system. Depending on the task or application, the second model could perform tasks such as sentiment analysis, intent recognition, context understanding, or generating a follow-up response based on the input provided by the user.

In some embodiments, the system may receive the first supplemental input from the user in response to generating for display, in the first user interface, the first textual input. The system may do this by detecting a facial expression of the user in response to generating for display, in the first user interface, the first textual input and generating a feature input for the second artificial intelligence model based on the facial expression and the first output. For example, the system may utilize facial recognition technology to detect and analyze the user's facial expressions. This could involve capturing video feed from a camera pointed at the user's face and using computer vision algorithms to identify facial landmarks and analyze expressions such as smiles, frowns, or raised eyebrows. The system generates the first textual input based on user interactions or inputs on the first user interface. This could be a message, prompt, suggestion, or any other form of text presented to the user. The generated text is then displayed on the first user interface. While the first textual input is displayed, the system continuously monitors the user's facial expressions for any changes or reactions in response to the displayed content. This involves analyzing facial expressions in real time to detect cues indicative of user engagement, satisfaction, confusion, or other emotional responses. Based on the detected facial expression, the system interprets the user's emotional state or reaction to the displayed textual input. For example, a smile might indicate agreement or satisfaction, while a frown might indicate disagreement or confusion. Using the interpreted facial expression and the first output (textual input) displayed on the first user interface, the system generates a feature input for the second artificial intelligence model. This feature input includes information about the user's emotional response as well as the context provided by the first output. The second model receives the feature input generated by the system and processes it according to its designated task or functionality. This could involve sentiment analysis, emotion recognition, intent detection, or any other relevant analysis based on the user's emotional response and the context provided by the first output. Based on the analysis performed by the second model, the system generates a second output, which could be a follow-up response, recommendation, action, or any other form of interaction designed to address the user's emotional state or response to the first output.

In some embodiments, the system may receive the first supplemental input from the user in response to generating for display, in the first user interface, the first textual input by detecting a verbal expression of the user in response to generating for display, in the first user interface, the first textual input and generating a feature input for the second artificial intelligence model based on the verbal expression and the first output. For example, the system may use speech recognition technology to detect and transcribe the user's verbal expressions. This involves capturing audio input from a microphone and converting it into text using automatic speech recognition (ASR) algorithms. The system generates the first textual input based on user interactions or inputs on the first user interface. This could be a message, prompt, suggestion, or any other form of text presented to the user. The generated text is then displayed on the first user interface. While the first textual input is displayed, the system continuously monitors the user's verbal expressions for any spoken responses or reactions. This involves real time speech recognition to capture and transcribe the user's verbal input. Based on the transcribed verbal expression, the system interprets the user's spoken response or reaction to the displayed textual input. This could involve analyzing the content, tone, sentiment, or intent conveyed in the user's verbal expression. Using the interpreted verbal expression and the first output (textual input) displayed on the first user interface, the system generates a feature input for the second artificial intelligence model. This feature input includes information about the user's verbal response as well as the context provided by the first output. The second model receives the feature input generated by the system and processes it according to its designated task or functionality. This could involve sentiment analysis, intent detection, context understanding, or any other relevant analysis based on the user's verbal response and the context provided by the first output. Based on the analysis performed by the second model, the system generates a second output, which could be a follow-up response, recommendation, action, or any other form of interaction designed to address the user's verbal response to the first output.

In some embodiments, the system may receive the first supplemental input from the user in response to generating for display, in the first user interface, the first textual input by detecting a change in a rate of entry of textual inputs of the user in response to generating for display, in the first user interface, the first textual input and generating a feature input for the second artificial intelligence model based on the rate of change and the first output. For example, the system monitors the user's rate of entry of textual inputs on the first user interface. This involves tracking the frequency and speed at which the user types or enters text. The system generates the first textual input based on user interactions or inputs on the first user interface. This could be a message, prompt, suggestion, or any other form of text presented to the user. The generated text is then displayed on the first user interface. While the first textual input is displayed, the system continuously monitors the user's rate of entry of textual inputs for any changes. This involves analyzing the timing and frequency of keystrokes or text input events. The system detects a change in the rate of entry of textual inputs. This could involve a sudden increase or decrease in typing speed, pauses in typing, or other patterns indicative of a change in the user's behavior or attention. Using the detected change in the rate of entry and the first output (textual input) displayed on the first user interface, the system generates a feature input for the second artificial intelligence model. This feature input includes information about the rate of change in textual inputs as well as the context provided by the first output. The second model receives the feature input generated by the system and processes it according to its designated task or functionality. This could involve analyzing the user's behavior, attention, engagement level, or any other relevant factors based on the rate of change in textual inputs and the context provided by the first output. Based on the analysis performed by the second model, the system generates a second output, which could be a follow-up response, recommendation, action, or any other form of interaction designed to address the user's change in behavior or attention in response to the first output.

In some embodiments, the system may receive the first supplemental input from the user in response to generating for display, in the first user interface, the first textual input by receiving a user selection in response to generating for display, in the first user interface, the first textual input, determining that the user selection corresponds to the first textual input as generated for display in the first user interface, and generating a feature input for the second artificial intelligence model based on the user selection corresponding to the first textual input and the first output. The system presents the first textual input on the first user interface. The user interacts with the interface, and the system monitors for any user selections made in response to the displayed textual input. This could involve clicking, tapping, or otherwise indicating a selection on the user interface. The system generates the first textual input based on user interactions or inputs on the first user interface. This could be a message, prompt, suggestion, or any other form of text presented to the user. The generated text is then displayed on the first user interface. Upon detecting a user selection, the system determines whether the selected content corresponds to the first textual input as generated and displayed on the first user interface. This involves comparing the selected content to the generated textual input to establish correspondence. If the user selection corresponds to the first textual input, the system generates a feature input for the second artificial intelligence model. This feature input includes information about the user selection and the context provided by the first output. The second model receives the feature input generated by the system and processes it according to its designated task or functionality. This could involve analyzing the user selection, understanding the user's intent or preference, or any other relevant analysis based on the user selection and the context provided by the first output. Based on the analysis performed by the second model, the system generates a second output, which could be a follow-up response, recommendation, action, or any other form of interaction designed to address the user's selection in response to the first output.

In some embodiments, the system may receive the first supplemental input from the user in response to generating for display, in the first user interface, the first textual input by detecting a biometric response of the user in response to generating for display, in the first user interface, the first textual input and generating a feature input for the second artificial intelligence model based on the biometric response and the first output. The system uses biometric sensors or devices to detect and measure the user's biometric response. This could include physiological responses such as changes in heart rate, skin conductivity (galvanic skin response), pupil dilation, facial expressions, or other biometric indicators of emotional or cognitive states. The system generates the first textual input based on user interactions or inputs on the first user interface. This could be a message, prompt, suggestion, or any other form of text presented to the user. The generated text is then displayed on the first user interface. While the first textual input is displayed, the system continuously monitors the user's biometric response for any changes or reactions. This involves real time measurement and analysis of the user's physiological or behavioral indicators using biometric sensors or devices. Based on the detected biometric response, the system interprets the user's emotional or cognitive state in response to the displayed textual input. This could involve analyzing patterns, trends, or changes in biometric indicators to infer the user's level of engagement, attention, interest, or other relevant factors. Using the interpreted biometric response and the first output (textual input) displayed on the first user interface, the system generates a feature input for the second artificial intelligence model. This feature input includes information about the user's biometric response as well as the context provided by the first output. The second model receives the feature input generated by the system and processes it according to its designated task or functionality. This could involve analyzing the user's emotional state, cognitive load, or other aspects of their biometric response, as well as considering the context provided by the first output. Based on the analysis performed by the second model, the system generates a second output, which could be a follow-up response, recommendation, action, or any other form of interaction designed to address the user's biometric response to the first output.

At step 408, process 400 (e.g., using one or more components described above) may generate a second output based on the second input. For example, the system may determine a second output, from a second artificial intelligence model, based on the first output and the first supplemental input, wherein the second artificial intelligence model is trained to generate second outputs, wherein second outputs predict modifications to the respective completed portions based on respective supplemental inputs at the respective times during the respective conversational interactions.

At step 410, process 400 (e.g., using one or more components described above) may generate a conversational recommendation based on the second output. For example, the system may generate a modified completed portion based on the second output and/or generate for display, in the first user interface, the modified completed portion.

In some embodiments, generating the modified completed portion based on the second output comprises the system determining a first change to the predicted completed portion based on the second output and determining the modified completed portion based on the first change. For example, the system may predict a completed portion based on the user input and any previous context. This could be a suggested completion or autocomplete suggestion generated by a model. The system analyzes the second output generated based on the user input and any additional context. This output could be a follow-up response, recommendation, or action generated by another model. Based on the analysis of the second output, the system determines the first change required in the predicted completed portion (or a new predicted completed portion). This could involve identifying modifications, corrections, and/or adjustments needed to improve the relevance, accuracy, or suitability of the suggested completion. Once the first change is identified, the system modifies the predicted completed portion accordingly to generate the modified completed portion. This modification could involve adding, removing, or replacing specific elements of the suggested completion to better align with the user's intent or the context provided by the second output (or generating a new portion entirely). The system may validate the modified completed portion to ensure its coherence, relevance, and appropriateness. If necessary, further refinements or adjustments can be made based on additional criteria or feedback. Finally, the system presents the modified completed portion to the user as a suggestion, recommendation, or autocomplete option. This modified completion is designed to better address the user's needs, preferences, or context as reflected in the second output.

In some embodiments, the system may generate the modified completed portion based on the second output by determining a first change to the seed portion (or a new seed portion entirely) based on the second output and determining the modified completed portion based on the first change. For example, the system initially generates a seed portion based on the user input and any previous context. This seed portion serves as the basis for generating the completed portion or suggestion. The system analyzes the second output, which could be a follow-up response, recommendation, or action generated by another model, based on the user input and any additional context. Based on the analysis of the second output, the system identifies the first change required in the seed portion. This change could involve adding, removing, and/or modifying specific elements of the seed portion (or creating an entirely new seed portion) to better align with the user's intent or the context provided by the second output. Once the first change is identified, the system applies it to the seed portion to generate the modified completed portion. This modification transforms the original seed portion into a revised version that better reflects the user's needs, preferences, or context as reflected in the second output. The system may validate the modified completed portion to ensure its coherence, relevance, and appropriateness. If necessary, further refinements or adjustments can be made based on additional criteria or feedback. Finally, the system presents the modified completed portion to the user as a suggestion, recommendation, or autocomplete option. This modified completion is designed to better address the user's input and context, as reflected in the second output.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

FIG. 5 shows a flowchart of the steps involved in generating conversational recommendations, in accordance with one or more embodiments. For example, the system may use process 500 (e.g., as implemented on one or more system components described above) in order to generate conversational recommendations using non-serialized interpretations of serialized inputs. For example, process 500 may represent an embodiment where dictation is used to generate content in a user interface (e.g., speaking out loud while a system transcribes the spoken words into written text).

At step 502, process 500 (e.g., using one or more components described above) may receive a verbal input. For example, the system may receive a first verbal input, at a first user interface from a user, wherein the first verbal input comprises a serialized input featuring a first portion and a second portion. For example, the first portion may be received prior to the second portion in the serialized input.

At step 504, process 500 (e.g., using one or more components described above) may interpret the verbal input to generate a first textual representation and a second textual representation. For example, the system may interpret the first portion and the second portion in order to generate a first textual representation corresponding to the first portion and a second textual representation corresponding to the second portion.

In some embodiments, interpreting the first portion and the second portion in order to generate the first textual representation corresponding to the first portion and the second textual representation corresponding to the second portion may comprise the system receiving a first set of training data, wherein the first set of training data comprises verbal inputs into respective user interfaces at respective times during respective conversational interactions, wherein the first set of training data comprises respective seed portions and respective completed portions for each of the verbal inputs. The system may then train, based on the first set of training data, an artificial intelligence model to generate textual representations.

In some embodiments, interpreting the first portion and the second portion in order to generate the first textual representation corresponding to the first portion and the second textual representation corresponding to the second portion may comprise the system determining a first completed portion of the first potential conversational recommendation corresponding to the second portion and determining the second textual representation corresponds to the first completed portion.

At step 506, process 500 (e.g., using one or more components described above) may generate for display the first textual representation. For example, the system may generate for display, in the first user interface, the first textual representation.

At step 508, process 500 (e.g., using one or more components described above) may receive a non-verbal input prior to generating for display the second textual representation. For example, the system may receive, prior to generating for display, in the first user interface, the second textual representation, a first supplemental input from the user, wherein the first supplemental input is a non-verbal input.

At step 510, process 500 (e.g., using one or more components described above) may reinterpret the verbal input using the non-verbal input to generate a conversational recommendation. For example, the system may reinterpret the first portion, based on the first supplemental input and the second textual representation, to generate a third textual representation corresponding to the first portion. The system may reinterpret the second portion, based on the third textual representation, to generate a fourth textual representation corresponding to the second portion. The system may generate for display, in the first user interface, a conversational recommendation corresponding to the first verbal input based on the third textual representation and the fourth textual representation.

In some embodiments, reinterpreting the first portion, based on the first supplemental input and the second textual representation, to generate the third textual representation corresponding to the first portion may comprise the system receiving a second set of training data, wherein the second set of training data comprises non-verbal inputs into respective user interfaces at respective times during respective conversational interactions, wherein the second set of training data comprises respective seed portions and respective completed portions for each of the non-verbal inputs. The system may train, based on the second set of training data, an artificial intelligence model to generate textual representations.

In some embodiments, reinterpreting the first portion, based on the first supplemental input and the second textual representation, to generate the third textual representation corresponding to the first portion may comprise the system determining a second seed portion of a second potential conversational recommendation corresponding to the first portion and determining the third textual representation corresponds to the second seed portion.

In some embodiments, determining the second seed portion of the second potential conversational recommendation corresponding to the first portion may comprise the system determining, based on the first supplemental input, a likelihood that the first portion corresponds to the first seed portion. The system may compare the likelihood to a threshold likelihood. The system may determine that the likelihood does not correspond to the threshold likelihood. In response to determining that the likelihood does not correspond to the threshold likelihood, the system determines to reinterpret the first portion.

In some embodiments, the system may generate for display, in the first user interface, a conversational recommendation corresponding to the first verbal input based on the third textual representation and the fourth textual representation. For example, the system may generate for display, in the first user interface, the first textual representation as a partial conversational recommendation. The system may remove the partial conversational recommendation from the first user interface prior to generating for display, in the first user interface, the conversational recommendation.

For example, the system may analyze the current context of the conversation or task to determine if a recommendation is warranted. This could involve understanding user queries, preferences, history, or any other relevant information. Based on the context analysis, the system generates a partial conversational recommendation. This could be a brief suggestion, hint, or partial response designed to guide the user or provide preliminary information. The partial recommendation is displayed on the first user interface, allowing the user to view and interact with it. While the partial recommendation is displayed, the system continues to monitor the conversation or user inputs for any changes or additional context that may impact the recommendation. Once sufficient information is available or the conversation progresses, the system generates the full conversational recommendation. This could be a more comprehensive suggestion or response based on the complete context and user needs. The system removes the partial recommendation from the first user interface and replaces it with the full recommendation. This ensures that the user receives the most relevant and complete information. The user can review the full recommendation and interact with it as needed, such as selecting options, providing feedback, or requesting further assistance. For example, by initially displaying a partial recommendation and then replacing it with the full recommendation, the system can provide users with timely guidance and support while ensuring that they receive comprehensive and relevant information as the conversation progresses. This approach helps to enhance user experience and satisfaction by delivering tailored recommendations based on evolving user needs and context.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for expanding available training data for artificial intelligence models used to generate conversational recommendations and/or generate conversational recommendations using non-serialized interpretations of serialized inputs.

2. The method of the preceding embodiment, the method comprising: receiving a first textual input from a user in a first user interface; in response to receiving the first textual input: generating for display, in the first user interface, the first textual input; and determining a first output, from a first artificial intelligence model, based on the first textual input, wherein the first output comprises a predicted completed portion based on a seed portion detected in the first textual input, and wherein the first artificial intelligence model is trained to generate first outputs, wherein the first outputs predict respective completed portions based on respective seed portions at respective times during respective conversational interactions; receiving a first supplemental input from the user in response to generating for display, in the first user interface, the first textual input; determining a second output, from a second artificial intelligence model, based on the first output and the first supplemental input, wherein the second artificial intelligence model is trained to generate second outputs, wherein the second outputs predict modifications to the respective completed portions based on respective supplemental inputs at the respective times during the respective conversational interactions; generating a modified completed portion based on the second output; and generating for display, in the first user interface, the modified completed portion.

3. The method of any one of the preceding embodiments, wherein receiving the first supplemental input from the user in response to generating for display, in the first user interface, the first textual input further comprises: detecting a gaze location on the first user interface; determining that the gaze location corresponds to a character in an alphanumeric character selection portion of the first user interface; and generating a feature input for the second artificial intelligence model based on the character and the first output.

4. The method of any one of the preceding embodiments, wherein receiving the first supplemental input from the user in response to generating for display, in the first user interface, the first textual input further comprises: detecting a gaze location on the first user interface; determining that the gaze location corresponds to the first textual input as generated for display in the first user interface; and generating a feature input for the second artificial intelligence model based on the gaze location and the first output.

5. The method of any one of the preceding embodiments, wherein receiving the first supplemental input from the user in response to generating for display, in the first user interface, the first textual input further comprises: detecting a facial expression of the user in response to generating for display, in the first user interface, the first textual input; and generating a feature input for the second artificial intelligence model based on the facial expression and the first output.

6. The method of any one of the preceding embodiments, wherein receiving the first supplemental input from the user in response to generating for display, in the first user interface, the first textual input further comprises: detecting a verbal expression of the user in response to generating for display, in the first user interface, the first textual input; and generating a feature input for the second artificial intelligence model based on the verbal expression and the first output.

7. The method of any one of the preceding embodiments, wherein receiving the first supplemental input from the user in response to generating for display, in the first user interface, the first textual input further comprises: detecting a change in a rate of entry of textual inputs of the user in response to generating for display, in the first user interface, the first textual input; and generating a feature input for the second artificial intelligence model based on the rate of change and the first output.

8. The method of any one of the preceding embodiments, wherein receiving the first supplemental input from the user in response to generating for display, in the first user interface, the first textual input further comprises: receiving a user selection in response to generating for display, in the first user interface, the first textual input; determining that the user selection corresponds to the first textual input as generated for display in the first user interface; and generating a feature input for the second artificial intelligence model based on the user selection corresponding to the first textual input and the first output.

9. The method of any one of the preceding embodiments, wherein receiving the first supplemental input from the user in response to generating for display, in the first user interface, the first textual input further comprises: detecting a biometric response of the user in response to generating for display, in the first user interface, the first textual input; and generating a feature input for the second artificial intelligence model based on the biometric response and the first output.

10. The method of any one of the preceding embodiments, further comprising: receiving a first set of training data, wherein the first set of training data comprises textual inputs into respective user interfaces at respective times during respective conversational interactions, wherein the first set of training data comprises the respective seed portions and the respective completed portions for each of the textual inputs; and training, based on the first set of training data, the first artificial intelligence model to generate first outputs.

11. The method of any one of the preceding embodiments, further comprising: receiving a second set of training data, wherein the second set of training data comprises respective supplemental inputs into the respective user interfaces at the respective times during the respective conversational interactions, wherein the respective supplemental inputs are non-textual inputs, and wherein the respective supplemental inputs; and training, based on the second set of training data, the second artificial intelligence model to generate second outputs.

12. The method of any one of the preceding embodiments, wherein generating the modified completed portion based on the second output further comprises: determining a first change to the predicted completed portion based on the second output; and determining the modified completed portion based on the first change.

13. The method of any one of the preceding embodiments, wherein generating the modified completed portion based on the second output further comprises: determining a first change to the seed portion based on the second output; and determining the modified completed portion based on the first change.

14. The method of any one of the preceding embodiments, wherein generating the modified completed portion based on the second output further comprises: determining a new predicted completed portion based on the second output and the seed portion; and determining the modified completed portion based on the new predicted completed portion.

15. The method of any one of the preceding embodiments, wherein generating the modified completed portion based on the second output further comprises: determining a new seed portion based on the second output; and determining the modified completed portion based on the new seed portion.

16. The method of any one of the preceding embodiments, the method comprising: receiving a first verbal input, at a first user interface from a user, wherein the first verbal input comprises a serialized input featuring a first portion and a second portion; interpreting the first portion and the second portion in order to generate a first textual representation corresponding to the first portion and a second textual representation corresponding to the second portion; generating for display, in the first user interface, the first textual representation; prior to generating for display, in the first user interface, the second textual representation, receiving a first supplemental input from the user, wherein the first supplemental input in a non-verbal input; reinterpreting the first portion, based on the first supplemental input and the second textual representation, to generate a third textual representation corresponding to the first portion; and reinterpreting the second portion, based on the third textual representation, to generate a fourth textual representation corresponding to the second portion; and generating for display, in the first user interface, a conversational recommendation corresponding to the first verbal input based on the third textual representation and the fourth textual representation.

17. The method of any one of the preceding embodiments, wherein interpreting the first portion and the second portion in order to generate the first textual representation corresponding to the first portion and the second textual representation corresponding to the second portion further comprises: receiving a first set of training data, wherein the first set of training data comprises verbal inputs into respective user interfaces at respective times during respective conversational interactions, wherein the first set of training data comprises respective seed portions and respective completed portions for each of the verbal inputs; and training, based on the first set of training data, an artificial intelligence model to generate textual representations.

18. The method of any one of the preceding embodiments, wherein reinterpreting the first portion, based on the first supplemental input and the second textual representation, to generate the third textual representation corresponding to the first portion further comprises: receiving a second set of training data, wherein the second set of training data comprises non-verbal inputs into respective user interfaces at respective times during respective conversational interactions, wherein the second set of training data comprises respective seed portions and respective completed portions for each of the non-verbal inputs; and training, based on the second set of training data, an artificial intelligence model to generate textual representations.

19. The method of any one of the preceding embodiments, wherein interpreting the first portion and the second portion in order to generate the first textual representation corresponding to the first portion and the second textual representation corresponding to the second portion further comprises: determining a first seed portion of a first potential conversational recommendation corresponding to the first portion; and determining the first textual representation corresponds to the first seed portion.

20. The method of any one of the preceding embodiments, wherein interpreting the first portion and the second portion in order to generate the first textual representation corresponding to the first portion and the second textual representation corresponding to the second portion further comprises: determining a first completed portion of the first potential conversational recommendation corresponding to the second portion; and determining the second textual representation corresponds to the first completed portion.

21. The method of any one of the preceding embodiments, wherein reinterpreting the first portion, based on the first supplemental input and the second textual representation, to generate the third textual representation corresponding to the first portion further comprises: determining a second seed portion of a second potential conversational recommendation corresponding to the first portion; and determining the third textual representation corresponds to the second seed portion.

22. The method of any one of the preceding embodiments, wherein determining the second seed portion of the second potential conversational recommendation corresponding to the first portion further comprises: determining, based on the first supplemental input, a likelihood that the first portion corresponds to the first seed portion; comparing the likelihood to a threshold likelihood; determining that the likelihood does not correspond to the threshold likelihood; and in response to determining that the likelihood does not correspond to the threshold likelihood, determining to reinterpret the first portion.

23. The method of any one of the preceding embodiments, wherein receiving the first supplemental input from the user further comprises: detecting a gaze location on the first user interface; and determining that the gaze location corresponds to a character in an alphanumeric character selection portion of the first user interface.

24. The method of any one of the preceding embodiments, wherein receiving the first supplemental input from the user further comprises: detecting a facial expression of the user in response to generating for display, in the first user interface, the first textual representation; and generating a feature input for an artificial intelligence model based on the facial expression and the first textual representation.

25. The method of any one of the preceding embodiments, wherein receiving the first supplemental input from the user further comprises: detecting a change in a rate of entry of inputs of the user in response to generating for display, in the first user interface, the first textual representation; and generating a feature input for an artificial intelligence model based on the rate of change and the first textual representation.

26. The method of any one of the preceding embodiments, wherein receiving the first supplemental input from the user further comprises: receiving a user selection in response to generating for display, in the first user interface, the first textual representation; determining that the user selection corresponds to the first textual representation as generated for display in the first user interface; and generating a feature input for an artificial intelligence model based on the user selection corresponding to the first textual representation.

27. The method of any one of the preceding embodiments, wherein receiving the first supplemental input from the user further comprises: detecting a biometric response of the user in response to generating for display, in the first user interface, the first textual representation; and generating a feature input for an artificial intelligence model based on the biometric response and the first textual representation.

28. The method of any one of the preceding embodiments, wherein the first portion is received prior to the second portion in the serialized input.

29. The method of any one of the preceding embodiments, further comprising: generating for display, in the first user interface, the first textual representation as a partial conversational recommendation; and removing the partial conversational recommendation from the first user interface prior to generating for display, in the first user interface, the conversational recommendation.

30. One or more non-transitory, computer-readable media storing instructions that, when executed by a data processing apparatus, cause the data processing apparatus to perform operations comprising those of any of embodiments 1-29.

31. A system comprising one or more processors and memory storing instructions that, when executed by the processors, cause the processors to effectuate operations comprising those of any of embodiments 1-29.

32. A system comprising means for performing any of embodiments 1-29.

What is claimed is:

1. A system for expanding available training data for artificial intelligence models used to generate conversational recommendations, the system comprising:
one or more processors; and one or more non-transitory, computer-readable media comprising instructions recorded thereon that when executed by the one or more processors cause operations comprising:
receiving a first set of training data, wherein the first set of training data comprises textual inputs into respective user interfaces at respective times during respective conversational interactions, wherein the first set of training data comprises respective seed portions and respective completed portions for each of the textual inputs;
receiving a second set of training data, wherein the second set of training data comprises respective supplemental inputs into the respective user interfaces at the respective times during the respective conversational interactions, and wherein the respective supplemental inputs are non-textual inputs;
training, based on the first set of training data, a first artificial intelligence model to generate first outputs, wherein the first outputs predict the respective completed portions based on the respective seed portions at the respective times during the respective conversational interactions;
training, based on the second set of training data, a second artificial intelligence model to generate second outputs, wherein the second outputs predict modifications to the respective completed portions based on the respective supplemental inputs at the respective times during the respective conversational interactions; and
receiving a first textual input from a user in a first user interface;
in response to receiving the first textual input:
generating for display, in the first user interface, the first textual input; and
generating, based on the first textual input, a first feature input for the first artificial intelligence model;
inputting the first feature input into the first artificial intelligence model to determine a first output, wherein the first output comprises a predicted completed portion based on a seed portion detected in the first textual input;
receiving a first supplemental input from the user in response to generating for display, in the first user interface, the first textual input;
generating a second feature input for the second artificial intelligence model based on the first supplemental and the first output;
inputting the second feature input into the second artificial intelligence model to determine a second output, wherein the second output comprises a modified completed portion; and
generating for display, in the first user interface, the modified completed portion.

2. A method for expanding available training data for artificial intelligence models used to generate conversational recommendations, the method comprising:
receiving, a first textual input from a user, in a first user interface;
in response to receiving the first textual input:
generating for display, in the first user interface, the first textual input; and
determining a first output, from a first artificial intelligence model, based on the first textual input, wherein the first output comprises a predicted completed portion based on a seed portion detected in the first textual input, and wherein the first artificial intelligence model is trained to generate first outputs, wherein the first outputs predict respective completed portions based on respective seed portions at respective times during respective conversational interactions;

receiving a first supplemental input from the user in response to generating for display, in the first user interface, the first textual input;

determining a second output, from a second artificial intelligence model, based on the first output and the first supplemental input, wherein the second artificial intelligence model is trained to generate second outputs, wherein the second outputs predict modifications to the respective completed portions based on respective supplemental inputs at the respective times during the respective conversational interactions;

generating a modified completed portion based on the second output; and generating for display, in the first user interface, the modified completed portion.

3. The method of claim 2, wherein receiving the first supplemental input from the user in response to generating for display, in the first user interface, the first textual input further comprises:

detecting a gaze location on the first user interface;

determining that the gaze location corresponds to a character in an alphanumeric character selection portion of the first user interface; and generating a feature input for the second artificial intelligence model based on the character and the first output.

4. The method of claim 2, wherein receiving the first supplemental input from the user in response to generating for display, in the first user interface, the first textual input further comprises:

detecting a gaze location on the first user interface;

determining that the gaze location corresponds to the first textual input as generated for display in the first user interface; and generating a feature input for the second artificial intelligence model based on the gaze location and the first output.

5. The method of claim 2, wherein receiving the first supplemental input from the user in response to generating for display, in the first user interface, the first textual input further comprises:

detecting a facial expression of the user in response to generating for display, in the first user interface, the first textual input; and generating a feature input for the second artificial intelligence model based on the facial expression and the first output.

6. The method of claim 2, wherein receiving the first supplemental input from the user in response to generating for display, in the first user interface, the first textual input further comprises:

detecting a verbal expression of the user in response to generating for display, in the first user interface, the first textual input; and generating a feature input for the second artificial intelligence model based on the verbal expression and the first output.

7. The method of claim 2, wherein receiving the first supplemental input from the user in response to generating for display, in the first user interface, the first textual input further comprises:

detecting a change in a rate of entry of textual inputs of the user in response to generating for display, in the first user interface, the first textual input; and generating a feature input for the second artificial intelligence model based on the rate of change and the first output.

8. The method of claim 2, wherein receiving the first supplemental input from the user in response to generating for display, in the first user interface, the first textual input further comprises:

receiving a user selection in response to generating for display, in the first user interface, the first textual input;

determining that the user selection corresponds to the first textual input as generated for display in the first user interface; and generating a feature input for the second artificial intelligence model based on the user selection corresponding to the first textual input and the first output.

9. The method of claim 2, wherein receiving the first supplemental input from the user in response to generating for display, in the first user interface, the first textual input further comprises:

detecting a biometric response of the user in response to generating for display, in the first user interface, the first textual input; and generating a feature input for the second artificial intelligence model based on the biometric response and the first output.

10. The method of claim 2, further comprising:

receiving a first set of training data, wherein the first set of training data comprises textual inputs into respective user interfaces at respective times during respective conversational interactions, wherein the first set of training data comprises the respective seed portions and the respective completed portions for each of the textual inputs; and training, based on the first set of training data, the first artificial intelligence model to generate first outputs.

11. The method of claim 10, further comprising:

receiving a second set of training data, wherein the second set of training data comprises respective supplemental inputs into the respective user interfaces at the respective times during the respective conversational interactions, and wherein the respective supplemental inputs are non-textual inputs; and training, based on the second set of training data, the second artificial intelligence model to generate second outputs.

12. The method of claim 2, wherein generating the modified completed portion based on the second output further comprises:

determining a first change to the predicted completed portion based on the second output; and determining the modified completed portion based on the first change.

13. The method of claim 2, wherein generating the modified completed portion based on the second output further comprises:

determining a first change to the seed portion based on the second output; and determining the modified completed portion based on the first change.

14. The method of claim 2, wherein generating the modified completed portion based on the second output further comprises:

determining a new predicted completed portion based on the second output and the seed portion; and determining the modified completed portion based on the new predicted completed portion.

15. The method of claim 2, wherein generating the modified completed portion based on the second output further comprises:

determining a new seed portion based on the second output; and determining the modified completed portion based on the new seed portion.

16. One or more non-transitory, computer-readable media comprising instructions recorded thereon that when executed by one or more processors cause operations comprising:

generating for display, in a first user interface, a first textual input in response to receiving a first textual input from a user;

determining a first output, from a first artificial intelligence model, based on the first textual input, wherein the first output comprises a predicted completed portion based on a seed portion detected in the first textual input;

receiving a first supplemental input from the user in response to generating for display, in the first user interface, the first textual input;

determining a second output, from a second artificial intelligence model, based on the first output and the first supplemental input; and generating a modified completed portion based on the second output.

17. The one or more non-transitory, computer-readable media of claim 16, wherein receiving the first supplemental input from the user in response to generating for display, in the first user interface, the first textual input further comprises:

detecting a gaze location on the first user interface;

determining that the gaze location corresponds to a character in an alphanumeric character selection portion of the first user interface; and generating a feature input for the second artificial intelligence model based on the character and the first output.

18. The one or more non-transitory, computer-readable media of claim 16, wherein receiving the first supplemental input from the user in response to generating for display, in the first user interface, the first textual input further comprises:

detecting a gaze location on the first user interface;

determining that the gaze location corresponds to the first textual input as generated for display in the first user interface; and generating a feature input for the second artificial intelligence model based on the gaze location and the first output.

19. The one or more non-transitory, computer-readable media of claim 16, wherein receiving the first supplemental input from the user in response to generating for display, in the first user interface, the first textual input further comprises:

detecting a facial expression of the user in response to generating for display, in the first user interface, the first textual input; and generating a feature input for the second artificial intelligence model based on the facial expression and the first output.

20. The one or more non-transitory, computer-readable media of claim 16, wherein receiving the first supplemental input from the user in response to generating for display, in the first user interface, the first textual input further comprises:

detecting a verbal expression of the user in response to generating for display, in the first user interface, the first textual input; and generating a feature input for the second artificial intelligence model based on the verbal expression and the first output.

\*   \*   \*   \*   \*